United States Patent
Kudva et al.

(10) Patent No.: US 11,620,178 B1
(45) Date of Patent: Apr. 4, 2023

(54) FAULT DETECTION

(71) Applicant: Arm Limited, Cambridge (GB)

(72) Inventors: Vignesh Devidas Kudva, Cambridge (GB); Ana Lasheras, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/515,886

(22) Filed: Nov. 1, 2021

(51) Int. Cl.
*G06F 11/07* (2006.01)
(52) U.S. Cl.
CPC ........ *G06F 11/0772* (2013.01); *G06F 11/079* (2013.01); *G06F 11/0721* (2013.01); *G06F 11/0793* (2013.01)
(58) Field of Classification Search
CPC ............. G06F 11/0721; G06F 11/0772; G06F 11/079; G06F 11/0793
See application file for complete search history.

(56) References Cited

U.S. PATENT DOCUMENTS

| | | | | |
|---|---|---|---|---|
| 7,035,891 B2 * | 4/2006 | Makineni | ............ | G06F 11/0721 708/530 |
| 10,353,767 B2 * | 7/2019 | Gianisis | .............. | G06F 11/2028 |

\* cited by examiner

*Primary Examiner* — Joseph R Kudirka
(74) *Attorney, Agent, or Firm* — Nixon & Vanderhye P.C.

(57) ABSTRACT

An apparatus has processing circuitry with at least two replicated computation blocks. Each computation block performs a particular calculation based on a respective input value to produce a respective output value to be used as a result of the calculation. The apparatus also has storage circuitry arranged on output paths of the computation blocks to store the output values of the computation blocks. The processing circuitry is operable in a fault detection mode in which the processing circuitry latches the output values of the computation blocks in the storage circuitry and presents, as the result of the calculations, the stored values. The processing circuitry also provides a first input value for a first computation block as an input value to one or more additional computation blocks of the at least two replicated computation blocks and compare the output values of the one or more additional computation blocks, when performing the calculation based on the first input value, with an output value of the first computation block when performing the calculation based on the first input value. If the processing circuitry detects a mismatch in the comparison, the processing circuitry determines that a fault exists in at least one of the computation blocks.

18 Claims, 8 Drawing Sheets

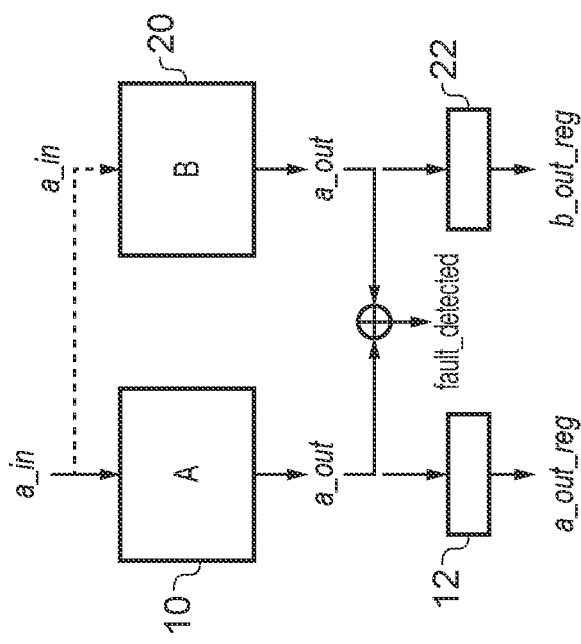
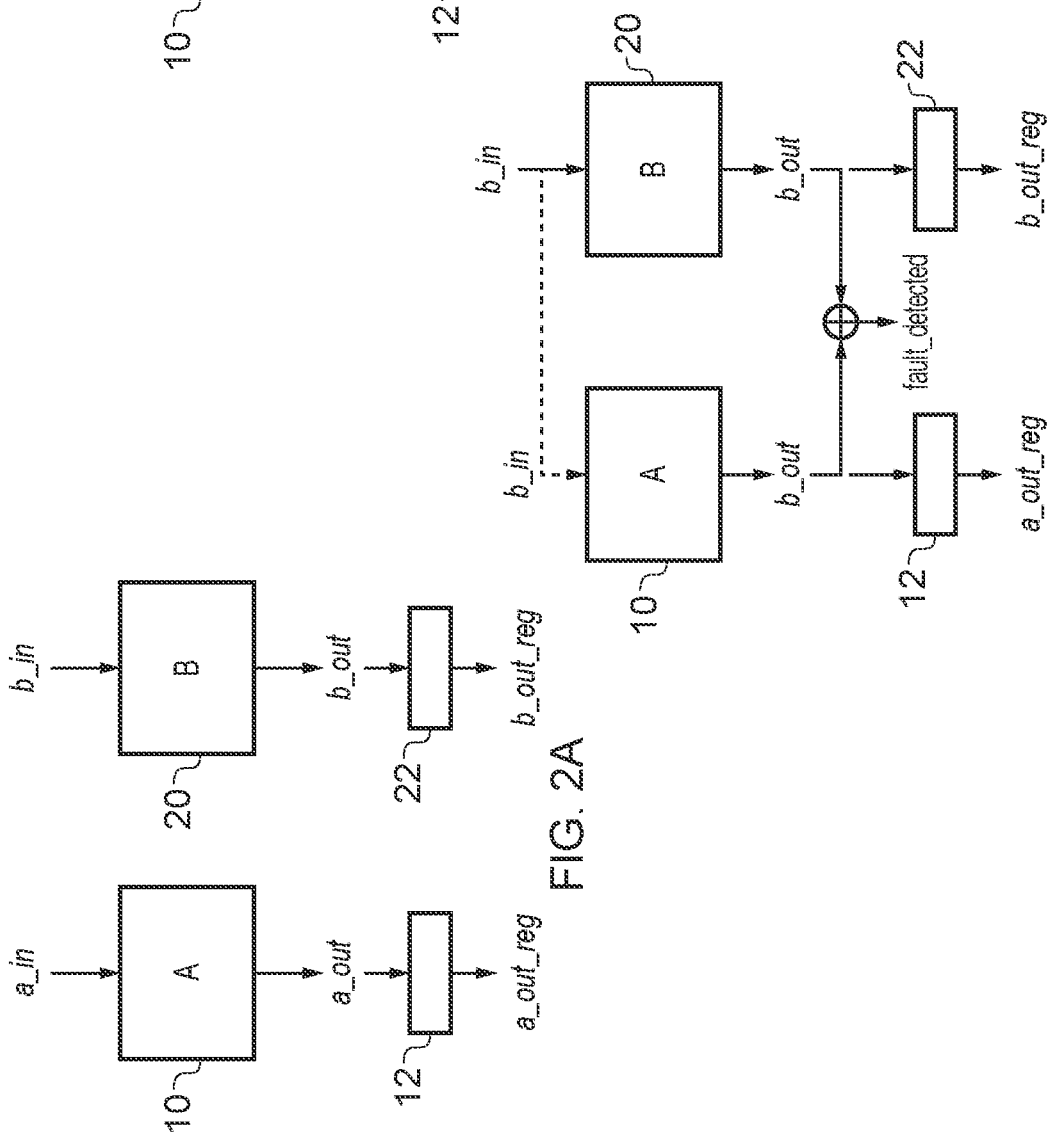
FIG. 2A
FIG. 2B
FIG. 2C

FAULT DETECTION

BACKGROUND

The present technique relates to the field of data processing. More particularly, the present technique relates to fault detection.

A fault in processing circuitry (such as a central processing unit (CPU) or graphics processing unit (GPU)) can compromise the system. For example, the fault may lead to incorrect results being calculated and/or applications crashing. In certain scenarios, e.g., where the processing circuitry is being used in safety critical systems such as the driving control systems of a vehicle, the fault could threaten the safety of the individuals involved.

Whilst eliminating or reducing the incidence of faults may be desirable, in many cases this is not possible, or it would be very difficult to entirely prevent faults occurring. As such, establishing the functional safety for a system focusses on ensuring that the system operates in a deterministic manner despite the presence of faults. For example, if a fault occurs in a CPU, a functionally safe system may identify the fault, disable certain functionality that is impacted by the fault and potentially notify a user that the fault has occurred and the functionality is no longer available.

SUMMARY

In one example arrangement, there is provided an apparatus comprising: processing circuitry comprising at least two replicated computation blocks, each computation block configured to perform a particular calculation based on a respective input value to produce a respective output value to be used as a result of the calculation; and storage circuitry arranged on output paths of the computation blocks and arranged to store the output values of the computation blocks; wherein the processing circuitry is operable in a fault detection mode to: latch the output values of the computation blocks in the storage circuitry and present, as the result of the calculations, the stored values; provide a first input value for a first computation block as an input value to one or more additional computation blocks of the at least two replicated computation blocks; and compare the output values of the one or more additional computation blocks, when performing the calculation based on the first input value, with an output value of the first computation block when performing the calculation based on the first input value; wherein the processing circuitry is responsive to detecting a mismatch in the comparison to determine that a fault exists in at least one of the computation blocks.

In another example arrangement, there is provided a method of performing fault detection, the method comprising: performing, by at least two replicated computation blocks, a particular calculation based on respective input values to produce respective output values to be used as the results of the calculation: when operating in a fault detection mode: latching the output values of the computation blocks in storage circuitry arranged on output paths of the computation blocks and arranged to store the output values of the computation blocks; presenting, as the result of the calculations, the stored values; providing a first input value for a first computation block as an input value to one or more additional computation blocks of the at least two replicated computation blocks; and comparing the output values of the one or more additional computation blocks, when performing the calculation based on the first input value, with an output value of the first computation block when performing the calculation based on the first input value; in response to detecting a mismatch in the comparison, determining that a fault exists in at least one of the computation blocks.

In a yet further example arrangement, there is provided a non-transitory computer-readable medium to store computer-readable code for fabrication of an apparatus comprising: processing circuitry comprising at least two replicated computation blocks, each computation block configured to perform a particular calculation based on a respective input value to produce a respective output value to be used as a result of the calculation; and storage circuitry arranged on output paths of the computation blocks and arranged to store the output values of the computation blocks; wherein the processing circuitry is operable in a fault detection mode to: latch the output values of the computation blocks in the storage circuitry and present, as the result of the calculations, the stored values; provide a first input value for a first computation block as an input value to one or more additional computation blocks of the at least two replicated computation blocks; and compare the output values of the one or more additional computation blocks, when performing the calculation based on the first input value, with an output value of the first computation block when performing the calculation based on the first input value; wherein the processing circuitry is responsive to detecting a mismatch in the comparison to determine that a fault exists in at least one of the computation blocks.

BRIEF DESCRIPTION OF THE DRAWINGS

Further aspects, features, and advantages of the present technique will be apparent from the following description of examples, which is to be read in conjunction with the accompanying drawings, in which:

FIGS. 2A-2C illustrate a fault detection process being performed;

DESCRIPTION OF EXAMPLES

Figure 1A:
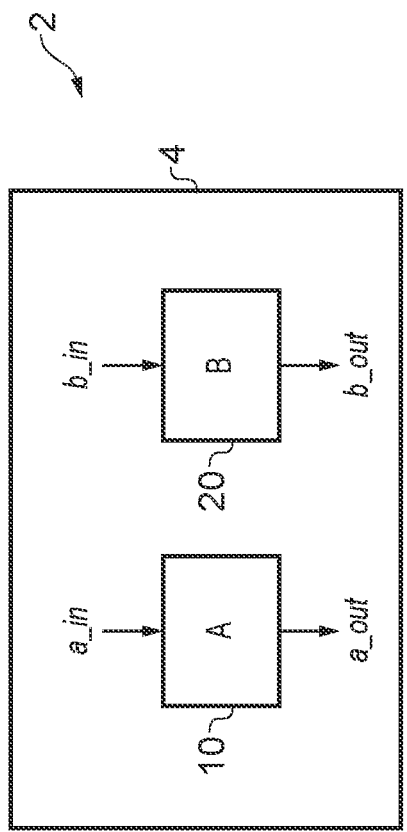
FIG. 1A is a schematic illustrating two replicated computation blocks.

Before discussing the embodiments with reference to the accompanying figures, the following description of embodiments is provided.

One aspect of providing a functionally safe system is the ability to identify faults that occur in processing circuitry. Once the fault has been identified, that aspect of processing circuitry may disabled, fixed if possible, or corrected for to ensure deterministic behaviour of the system. However, if such a fault is not identified, the behaviour of the system may become unpredictable and incorrect results may result. As mentioned above, where the processing circuitry is part of a safety-critical system, this could even be dangerous to individuals.

Faults occurring in a system can be broadly classified into the following categories:

- systematic faults introduced into a system due to bugs in hardware and software design; and
- random faults including:
- transient faults caused by high-energy neutron or alpha particle strikes in integrated circuits. These mostly occur on flip-flops and remain temporarily, and
- stuck-at faults which are permanent faults where signals in integrated circuits become tied to a logical 0 or 1 value. These can occur for example due to manufacturing defects and/or ageing of the system.

The present techniques are primarily concerned with the detection of random faults and in particular stuck-at faults, however, it will be appreciated that the techniques described herein may also be used to detect other types of faults.

One approach to performing fault detection involves the use of software test libraries (STLs). STLs are diagnostic software routines that detect stuck-at faults in a processor. These work by detecting in software that there is available capacity in the processing circuitry or a part of the processing circuitry to perform tests. These tests can then be performed in the background. This approach is area-efficient in the sense that further physical circuitry is not required in order to enable this scheme of fault detection since the STLs operate in software, however, the diagnostic coverage afforded by such an approach is limited. For example, with the use of STLs, it may not be possible to recreate various external stimuli in response to which the processing circuitry can operate. As such, this approach to detecting faults may be limited in its ability to detect issues in the response to such stimuli.

Another approach to detecting faults involves monitoring flop parity. In this setup, registers and comparators are added per flop or for a set of flops to detect faults in the design. To detect faults (and in particular transient faults) for a register comprising a set of flops, the parity of the input to the register may be determined (e.g., by XORing the bits of the input). It is expected that this parity will match the parity of the output to the register. Thus, by determining the parity of the output of the register (e.g., by XORing the bits of the output) and comparing the parity of the output with the registered parity of the input, transient faults that change the value stored in a flop of the set of faults can be detected as a mismatch in the parities. This approach runs all the time and so can be used to detect both transient and stuck-at faults on the flip-flops, however, this approach can be expensive both in terms of the power consumed to perform the comparisons as the processor is operating and in terms of the physical area required in the processing circuitry to extend the flops with the registers and comparators.

Further, a technique called dual core lock step (DCLS) may be used to detect faults. This involves running two cores in parallel performing the same workload and comparing the outputs of the cores at each cycle. Although this approach is highly accurate, it is expensive in terms of area and power since an entire additional core needs to provided along with circuitry needed to perform the comparisons.

To provide a power and area efficient technique for performing fault detection in processing circuitry, the techniques described herein make use of the fact that duplicated logic is often already present in processors. For example, a CPU may contain a series of replicated computation blocks for performing the same or similar calculations. This may be the case where calculating a result involves performing the same calculation many times for different inputs with the results combined to provide the output. Thus, instead of (or as well as) duplicating the entire processor, the results of the replicated computation blocks can be used to ensure the correctness of one another.

The inventors recognised that in many cases, processors (such as a CPU or GPU) are provided with many replicated blocks that are designed to perform the same calculations as each other. Therefore, in response to the same inputs, the outputs of these computation blocks are expected to be the same in the absence of any faults. Thus, a discrepancy in the outputs produced by such computation blocks operation in response to the same inputs may be indicative of a fault (such as a stuck-at fault) in a computation block.

Further, the inventors realised that there may be deterministic intervals during which the inputs to the blocks remain stable. During these periods, the output values of the computation blocks are also expected to be stable. Therefore, as long as the correct output value calculated by the computation block can be presented downstream to any components relying on that output value, the inputs to the blocks themselves and the outputs actually being produced by the blocks during that period can be modified and used to perform fault detection without interfering with the operation of the processor.

By making use of the stable period of the inputs in this way to perform fault detection on the replicated computation blocks, using a technique which may be termed design re-use for fault detection (DRFD), the functional safety of hardware blocks can be improved and stuck-at faults (and potentially other types of fault) detected with a high level of diagnostic coverage whilst being efficient in terms of both the processor area required to support such fault detection and the power consumed in doing so.

In accordance with the techniques described herein, there is provided an apparatus comprising processing circuitry. The processing circuitry may for example comprise a central processing unit (CPU), graphics processing unit (GPU), or parts thereof. In some examples, the processing circuitry may control a system such as safety-critical system (e.g., control logic in a vehicle). In such cases, the functional safety of the processing circuitry may be of particular importance since errors in the operation of the processing circuitry could affect the operation of the system and potentially endanger individuals and/or property.

The processing circuitry comprises at least two replicated computation blocks. The computation blocks may be any part of the processing circuitry that are replicated such that more than one instance of the computation block is present in the processing circuitry. The computation blocks may be configured to perform a particular calculation based on respective input value to produce one or more respective output values to be used as results of the calculation. Thus, the processing may comprise a pair of such computation blocks that are intended to be identical to each other, or may in some cases be provided with a series of more than two such computation blocks. The computation blocks may be directly responsive to provision of the input values to perform the calculation associated with that particular block so as to produce the output value.

The output values from the computation blocks may then be used for example as input values to further computations and/or as the results of an overall calculation being performed by the processing circuitry.

To store the output values of the computation blocks while the fault detection process is occurring, the apparatus is also provided with storage circuitry. The storage circuitry may be arranged on the output paths of the computation blocks so as to effectively intercept the output values being output from the computation blocks to whichever part of the processing circuitry is making use of those values. The storage circuitry could take a number of possible forms, but in some examples, the storage circuitry comprises a flip-flop for each computation block. This may be the case where the output of each computation block is a single bit and so by using flip-flops the area overhead for supporting the fault detection process can be kept low. In some examples, however, such as where the output for the computation blocks is larger, registers may be provided to store the output values. Depending on the extent of the output values themselves and the number of computation blocks, a single register may be provided for all of the computation blocks, or each computation block may be provided with its own register to store the output values.

Regardless of the particular form of the storage circuitry, the storage circuitry is operable to temporarily store the output values from the computation blocks and provide the stored output values to downstream components of the processing circuitry as they were the output values directly from the computation blocks.

The processing circuitry may support more than one mode of operation, for example a normal processing mode and a fault detection mode. When in the normal processing mode, the processing circuitry operates using the computation blocks to carry out calculations in response to potentially varying input values in order to determine output values which are then provided to downstream components of the processing circuitry that make use of those output values. The processing circuitry may also be operable in a fault detection mode and may be configured to opportunistically switch into the fault detection mode to perform fault detection for example when it is determined that use of the fault detection mode will not impact the processing being performed by the processing circuitry. This may be done on the basis that during certain periods of operation, performing fault detection would interfere with the normal operation of the processing circuitry, whereas during other periods (e.g., when the inputs to the computation blocks are stable and so the outputs are expected to be stable), fault detection can be performed without affecting the processing circuitry's operations.

In accordance with the techniques described herein, when operating in the fault detection mode, the processing circuitry is configured to latch the output values of the computation blocks in the storage circuitry and to present those stored values as the results of the calculations being performed by the computation blocks. That is, the storage circuitry temporarily stores the results of the calculations as calculated by the computation blocks. Then these results are presented to downstream components as if they were coming directly from the computation blocks in response to the input values to those computation blocks. But instead of being directly responsive to the input values as would be the case for the output values of the computation blocks, the results of the calculations being presented values are temporarily fixed as being the values latched in the storage circuitry regardless of what it actually being output but the computation blocks at that point. This allows the input values to the computation blocks to be modified without interfering with the operation of any components that are making use of the results of the calculations.

To detect whether there is a fault with the computation blocks, a first input value for a first computation block is provided as an input value to one or more additional computation blocks of the at least two replicated computation blocks. That is, the input from one of the computation blocks is diverted to one or more of the other computation blocks such that those additional computation blocks are also operating in response to the same input value as that first computation block. Where the computation blocks are each operable in response to more than one input value, all of the input values to the first computation block may be provided to the other computation blocks. By diverting the input values in this way, the additional computation block or blocks can be made to operate using the same input as the first computation block.

With the output values latched and presented as the results of the calculation, this diverting of inputs does not affect downstream components making use of the results of those calculations.

Since the computation blocks are replicated, in the absence of any faults, it would be expected that when operating on the same input values, the output values of the computation blocks would be the same as each other. Therefore, to detect faults in the computation blocks, the processing circuitry is configured to compare the output vales of the one or more additional computation blocks with the output value of the first computation blocks (and with each other if there is more than one additional computation block). If the computation blocks each output more than one output value, the respective output values may be compared with one another.

If the processing circuitry detects a mismatch between the output values, the processing circuitry is configured to determine that a fault exists in at least one of the computation blocks subject to the comparison. Upon detection of such a fault, the processing circuitry may perform any of a number of possible actions. For example, the processing circuitry may perform or trigger at least one of storing an indication of the fault in a register, raising an exception, disabling functionality associated with the one or more computation blocks for which the fault was detected and notifying a user that functionality associated with the one or more computation blocks is disabled. Hence, even if a fault does exist in the processing circuitry, the fault may be detected and appropriate action taken to ensure that the apparatus operates in a deterministic manner.

Thus, in accordance with the techniques described herein, faults in the computation blocks can be detected without affecting the operation of the processing circuitry itself.

Moreover, these techniques do not require a large amount of additional power to be consumed in order to carry out the fault detection. Further, by providing the processing circuitry with logic to perform the diverting of inputs, the storage circuitry, and comparators to compare the output values in addition to the circuitry already required to perform the calculations themselves, the apparatus may be configured to leverage the existing replication of computation blocks to perform fault detection. This therefore provides an efficient approach to fault detection in terms of the additional area required to support the fault detection.

It will be appreciated that where a mismatch is detected between the output values of the computation blocks, although the processing circuitry may determine that a fault exists somewhere in the at least two computation blocks, it may not be possible to determine in which computation block the fault exists. In some cases, it may be sufficient to determine that a fault exists somewhere in that set of computation blocks, however, in some cases, other combinations of computation blocks may be used to identify more specifically which computation block has the fault. An example of this process is described in more detail below with respect to FIGS. 3A and 3B.

It is also possible that more than one of the replicated computation blocks has a fault and so the mismatch in the output values could for example be due to the faults in more than one computation block affecting the output value.

Different faults may affect the operation of the computation blocks in different ways. For example, for some faults the operation of the computation block may be entirely unchanged due to that fault. Since such a fault does not affect the output values being produced by the computation block, this fault will neither be detected using the techniques described herein nor is the fault necessarily a problem since it does not affect the operation of the computation block and so will not impact the results produced by the processing circuitry.

Further, it should be appreciated that the fault detection operation performed in response to a particular set of input values is limited to faults that appear when those input values are used. That is, since the fault detection relies on the input values that are input to the computation blocks from elsewhere (e.g., externally or elsewhere in the processing circuitry), the fault detection is only performed for the input values that are actually provided.

A mismatch not being detected by the processing circuitry is therefore not necessarily indicative that a fault is not present in the computation block at all, but rather that a fault is not present that affects the result of the computation block when operating in response to the first input value.

To extend the number of input values for which the fault detection is performed and so provide more complete testing of the computation blocks, in some examples, the processing circuitry is configured to further provide a second input value of a second computation block to at least the first computation block and compare the output values of the second computation block with at least the first computation block. By using the input from a different computation block in this way, a potentially different input value may be provided to the computation blocks so that the results may be compared. The second input value from this second computation block may be provided to all of the same computation blocks as were provided with the first input value from the first computation block or this input value may be provided to just the first computation block. Since the fault detection process may only be able to detect faults that occur in response to the input values for which the process is actually carried out, this approach extends the coverage of the fault detection process, making use of the potentially different input values provided to the different computation blocks.

In some examples, to identify when an opportunity to switch to the fault detection mode is available, the apparatus may comprise fault detection control circuitry configured to detect an upcoming period for which input values to the processing circuitry are expected to be stable and, in response to detecting that the input values are to be stable, cause the processing circuitry to enter the fault detection mode. Thus, the fault detection control circuitry can ensure that the fault detection mode is used when the input values are not going to change and so it is known that the results of the calculation are not going to change. In this situation it will be known that latching the output values and presenting those latched values as the results of the calculations will still lead to the correct results being presented. The fault detection control circuitry may identify that upcoming period in which the inputs are to be stable in a number of ways but in some cases this is done by recognising a pattern of input values known to be followed by a period in which the input values are stable or by detecting a mode of operation of the apparatus corresponding to the input values being stable for a particular period of time.

The fault detection circuitry may be configured to cause the processing circuitry to enter the fault detection mode only when the inputs are predicted to be stable for a sufficient period of time to allow the fault detection process to occur. This period may be for example be a particular number of clock cycles. In such a case, timing for the processing circuitry may be provided by a clock signal and the fault detection circuitry may be configured to cause the processing circuitry to enter the fault detection mode in response to detecting that the input values will be stable for a number of clock cycles exceeding a threshold number of clock cycles.

In some examples, the control mechanism to find a fault detection window is always on and after detecting the condition where we can trigger the fault detection mechanism it takes one clock cycle to latch the output values, another clock cycle to run the fault detection mechanism for the first input value and compare the outputs and another clock cycle to run the fault detection mechanism for the second input value (if using). Hence, the threshold may be two clock cycles to allow fault detection if only the first input value from the first computation block is to be used or may be three clock cycles to allow fault detection if both the first and second input values from the first and second computation blocks respectively are used. It will be appreciated that in other examples, the operations may take a different number of clock cycles to carry out and/or a different number of inputs may be used as part of the fault detection process such that the threshold number of clock cycles may differ.

To make sure that the processing circuitry is operating in the normal processing mode again before the input values are varied and so the expected results of the calculations performed by the computation blocks change, the fault detection circuitry may be configured to identify an expected change in the input values and cause the processing circuitry to exit the fault detection mode.

In some examples, the apparatus comprises only a pair of replicated computation blocks and so the fault detection process may involve comparing the outputs of the computation blocks in response to an input that was to the first computation block and an input that was to the second computation block. However, in some cases, there may be more computation blocks and indeed there may be a large number of replicated computation blocks that are all configured to perform the same calculation. In this case, to carry out fault detection, the computation blocks may be considered in pairs. Thus, when operating in the fault detection mode, the processing circuitry provides a first input value for a first computation block of each pair to the other computation block in the pair. Then, the output values of each pair can be compared to determine whether there is a mismatch. A mismatch being detected can then be used to determine that a fault exists in the pair for which the mismatch was detected. The input to the second computation block in each pair may then be provided to the first computation block in the pair so as to make use of both input values for the pair. This approach allows the fault detection process to be performed quickly for a potentially large number of computation blocks to ascertain whether a fault exists in any of the pairs.

If the processing circuitry comprises an odd number of computation blocks, one of the computation blocks may for example be grouped with one of the pairs of computation blocks and the fault detection process be carried out for the group of three computation blocks.

If such a fault is detected for a pair, the processing circuitry may raise an exception, disable functionality associated with the pair of computation blocks and/or notify a user as described above. In some examples, an indication that the fault was detected for the particular pair of computation blocks is also (or instead) stored. This indication may identify the particular pair for which the fault was detected and so appropriate action (e.g., disabling functionality associated with the blocks) may be taken in respect only of the pair having the fault.

In some examples, an indication of whether a fault was detected for each pair of computation blocks is stored. This indication can similarly be used to identify for which particular pair of computation blocks the fault was detected. However, to more conveniently determine whether a fault exists in any of the blocks, the processing circuitry may be configured to perform a logical OR operation to combine the indications of whether a fault was detected for each pair of the replicated computation blocks into a single indication of whether a fault was detected in any of the blocks.

The calculations being performed by the computation blocks could be any of a range of possible calculations. In some cases, the calculations being performed computation blocks may be entirely distinct and relating to parts of different overall calculations. However, one reason for the presence of the multiple replicated computation blocks may be because each computation block is to perform a part of an overall calculation where the results of the calculation performed by each computation block are combined to produce an overall result. For example, each computation block may be configured to calculate one or more bits of a particular result with the outputs of each computation block concatenated together to arrive at the overall result of the calculation. It will however be appreciated that the processing circuitry may be provided with multiple computation blocks for other purposes and the results of the different computation blocks in general need not be combined in this way.

One particular application of the present techniques is in the context of an interrupt controller and wakeup controller. The wakeup controller may be associated with a particular core and arranged to receive interrupts for that particular core. When the core is in an awake state, all of the interrupts may be passed to the core, however, when the core is in a sleep state, it may be that only certain interrupts are allowed to wake the core from the sleep state. The interrupt controller may be arranged to calculate an interrupt mask that indicates for each of a plurality of possible interrupts, whether that interrupt should be allowed to wake the core. This calculation may be performed on the basis of the priority of the interrupts and an enable configuration of the core. The enable configuration is itself established by writing an interrupt set enable register and indicates which interrupts can be used and which ones cannot be used to disrupt the core instruction execution. Since the calculations for each interrupt may be the same calculation and the calculations independent from one another, the interrupt controller may use a plurality of replicated computation blocks to perform the calculations, with each computation block performing the calculation of a portion of the interrupt mask for a different possible interrupt. The portions of the interrupt mask may then be concatenated to produce the interrupt mask.

This interrupt mask may be used by the wakeup controller on receipt of a particular interrupt to determine whether the core should be awakened from the sleep state. By comparing the particular interrupt with the interrupt mask, the wakeup controller can determine whether that interrupt is allowed to wake the core. If the interrupt is allowed to wake the core from the sleep state, the wakeup controller may be configured to awaken the core from the sleep state to handle the interrupt. In some examples, the wakeup controller is an internal wakeup interrupt controller (IWIC) and the interrupt controller is nested vector interrupt controller wakeup interrupt controller (NVIC WIC).

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define an HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, or using a including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc.

An integrated circuit fabricated using the computer-readable code may comprise components such as one or more of a central processing unit, graphics processing unit, neural processing unit, digital signal processor or other components that individually or collectively embody the concept.

Particular examples will now be described with reference to the figures.

FIG. 1A is a schematic illustrating an apparatus 2 comprising processing circuitry 4 with two replicated computation blocks 10, 20. The processing circuitry 4 may for example be a CPU. The computation blocks 10, 20 represent logic of the processing circuitry 4. The computation blocks 10.20 are the same other than any faults that exist in those computation blocks 10, 20. Each computation block performs a calculation on an input value a_in, b_in to produce a respective output value a_out, b_out. Since the computation blocks are replicated, it is expected that in the absence of any faults if a_in equals b_in then a_out will equal b_out. If a_in is the same as b_in but a_out is the not the same as b_out then this could be indicative of a fault in one or both of the computation blocks 10, 20.

Figure 1B:
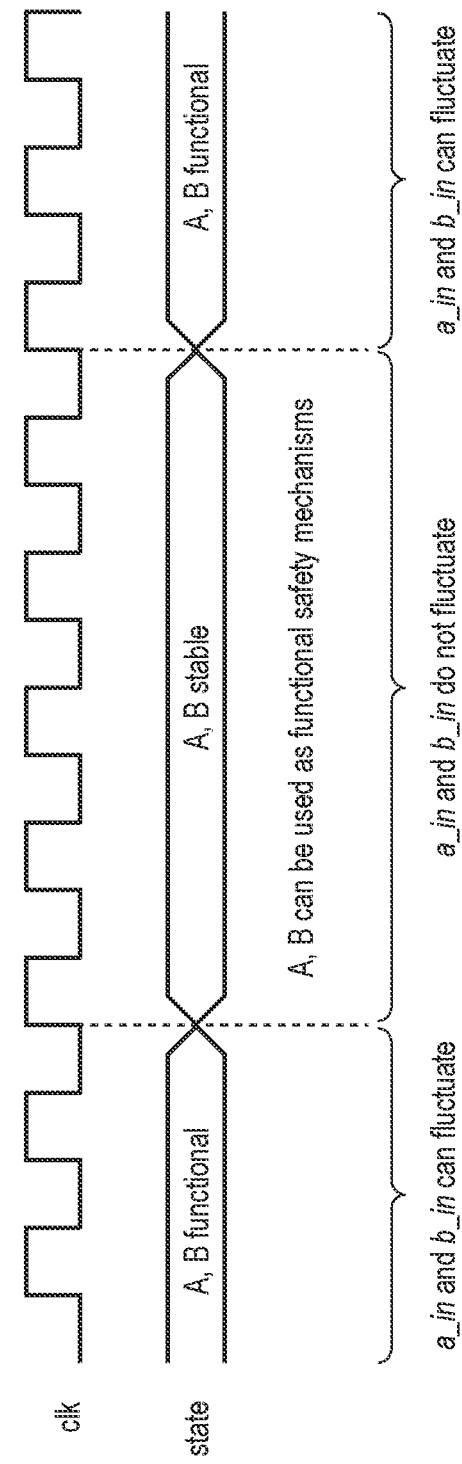
FIG. 1B is a timing diagram illustrating a period in which the processing circuitry is operable in a fault detection mode.

FIG. 1B is a timing diagram illustrating the stability or otherwise of the input to the computation blocks 10, 20. The processing circuitry 4 operates in response to a clock signal to synchronise the operations of the processing circuitry 4. This clock signal is shown in the top line of FIG. 1B. The second line of FIG. 1B depicts a first period during which the inputs to the computation blocks 10, 20 are functional and the inputs may vary followed by a period in which the inputs are stable and are known not to change, followed in turn by another period in which the inputs to the computation blocks 10, 20 may fluctuate.

During the periods in which the inputs may fluctuate, the computation blocks 10, 20 operate in a normal processing mode to perform their respective calculations based on the input values to the computation blocks 10, 20 in order to produce the output values. These output values may be used elsewhere in the processing circuitry 4 and so the correctness of these output values may be relied on by other parts of the processing circuitry 4.

However, during the period in which it is known that the inputs are to be stable, although the output values of the computation blocks 10, 20 may be used elsewhere by the processing circuitry 4, the computation blocks 10, 20 do not necessarily need to be used for performing the calculations since it is known that the outputs should be stable. This fact can therefore be taken advantage of in order to perform fault detection for the computation blocks during this period.

FIG. 2A illustrates the same computation blocks 10, 20 but in this case, the apparatus 2 further comprises storage circuitry 12, 22 in the form of a flip-flop for each computation block 10, 20. Thus, at the beginning of the period in which the inputs to the computation blocks 10, 20 are known to be stable and once the output values a_out and b_out corresponding to those input values have been calculated, the output values are latched in the flip-flops and presented to downstream components as a_out_reg and b_out_reg. To the downstream components that receive these values, these appear as the result of the calculations of the computation blocks 10, 20 and may be used in further calculation or as the result of a calculation being performed by the computation blocks 10, 20.

Having latched the output values in the flip-flops 12, 22, the input value to computation block A 10, is diverted so as to be input to both computation block A 10 and computation block B 20, as illustrated in FIG. 2B. As FIG. 2B shows, with the input a_in diverted in this way, the output to both computation blocks 10, 20 becomes the output produced in response to input a_in, i.e., a_out. However, since the output values were previously latched into the flip-flops 12, 22, this does not affect the results of the calculations such as might be provided to any downstream components.

With both computation blocks 10, 20 operating in response to the same input value a_in, it is expected that both computation blocks 10, 20, in the absence of any faults, will produce the same output value. However, if the computation blocks 10, 20 produce different values, this could be indicative of a fault in one of the computation blocks 10, 20 that affects how it performs calculations. Therefore, the two output values of the computation blocks 10, 20 are compared and if a mismatch is detected in the comparison it can be considered that a fault has been detected. In response to such a fault, the apparatus 2 may raise an exception, notify the user, store an indication of the fault and/or disable functionality associated with the computation blocks 10, 20.

It should be noted that if a fault is detected in this way, it may not be known whether the fault exists in computation block A 10 or computation block B 20, only that a fault has occurred in at least one of the two (there could also be a fault in both). This process will also only detect a fault in the operation of the computation blocks 10, 20 that affects how the computation blocks handle input a_in. If one of the computation blocks 10, 20 has a fault that affects how it handles a different input, this may not be detected at this point.

Therefore, to provide further coverage, this fault detection process may be repeated frequently (e.g., each time the inputs are stable for a certain period of time). If the inputs to the computation blocks 10, 20 are different on the different instances the process is performed, any faults arising for those inputs may be detected.

Another way in which the coverage of the fault detection process can be extended is by making use of the other input to the pair of computation blocks 10, 20 since the input b_in has not yet been used. This is illustrated in FIG. 2C for which the input b_in is provided to both computation blocks 10, 20 and the output values of the computation blocks 10, 20 compared. Again, a mismatch in the comparison would be indicative of a fault in one or both of the computation blocks.

Figure 3A:
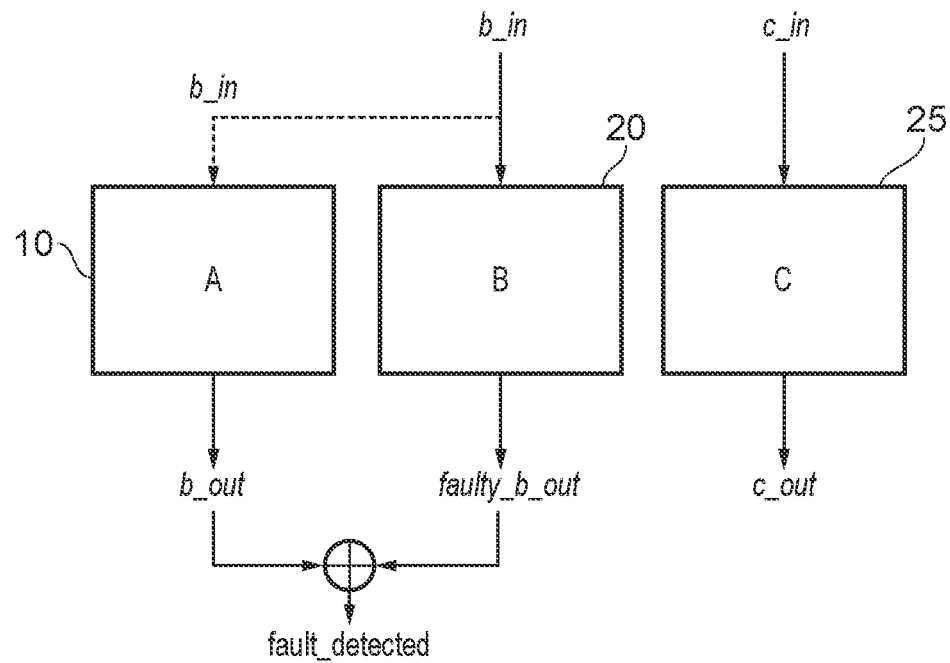
FIGS. 3A-3B illustrate a fault detection process to identify which of a pair of blocks has a fault.
Figure 3B:
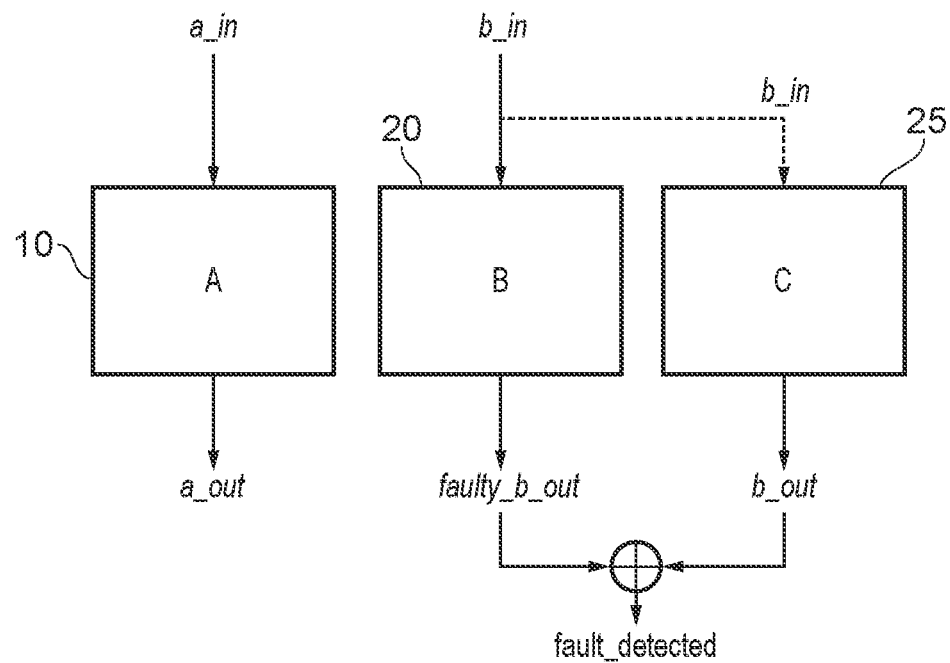

If a mismatch is detected when comparing the outputs of the two computation blocks 10, 20 it may not be known in which of the blocks 10.20 the fault exists. FIGS. 3A and 3B illustrate a further process that may be carried out to establish where the fault lies. FIG. 3A illustrates a process corresponding to the process depicted in FIG. 2C in which the input to computation block B 20 is provided to both computation blocks A 10 and B 20. FIG. 3A also depicts a third computation block, computation block C 25, which is not involved in this step of the comparison and may for example be involved in its own pair-wise fault detection process with a further computation block (not shown).

In the example of FIG. 3A, the computation block B 20 has a fault and so the output, faulty_b_out, is produced by computation block B 20. A mismatch is then detected in the comparison of the outputs and so the processing circuitry determines that a fault exists in one or both of the computation blocks A 10 and B 20.

In order to determine where the fault lies, the input to computation block B 20 may then be provided to both computation blocks B 20 and C 25 as illustrated in FIG. 3B and the outputs of these computation blocks compared. Since computation block B 20 has a fault that impacts the output that is produced in response to b_in, the faulty output value, faulty_b_out is again output by computation block B 20. In this example, computation block C 25 is functioning correctly and so outputs the correct output value, b_out. In the comparison therefore, a mismatch is again detected.

On the basis of these two comparison, the processing circuitry can therefore determine that the computation block B 20 is the computation block with the fault. In some examples, a further similar test may also be performed using computation blocks A 10 and C 25 to determine whether computation block A 10 also has a fault.

Figure 4:
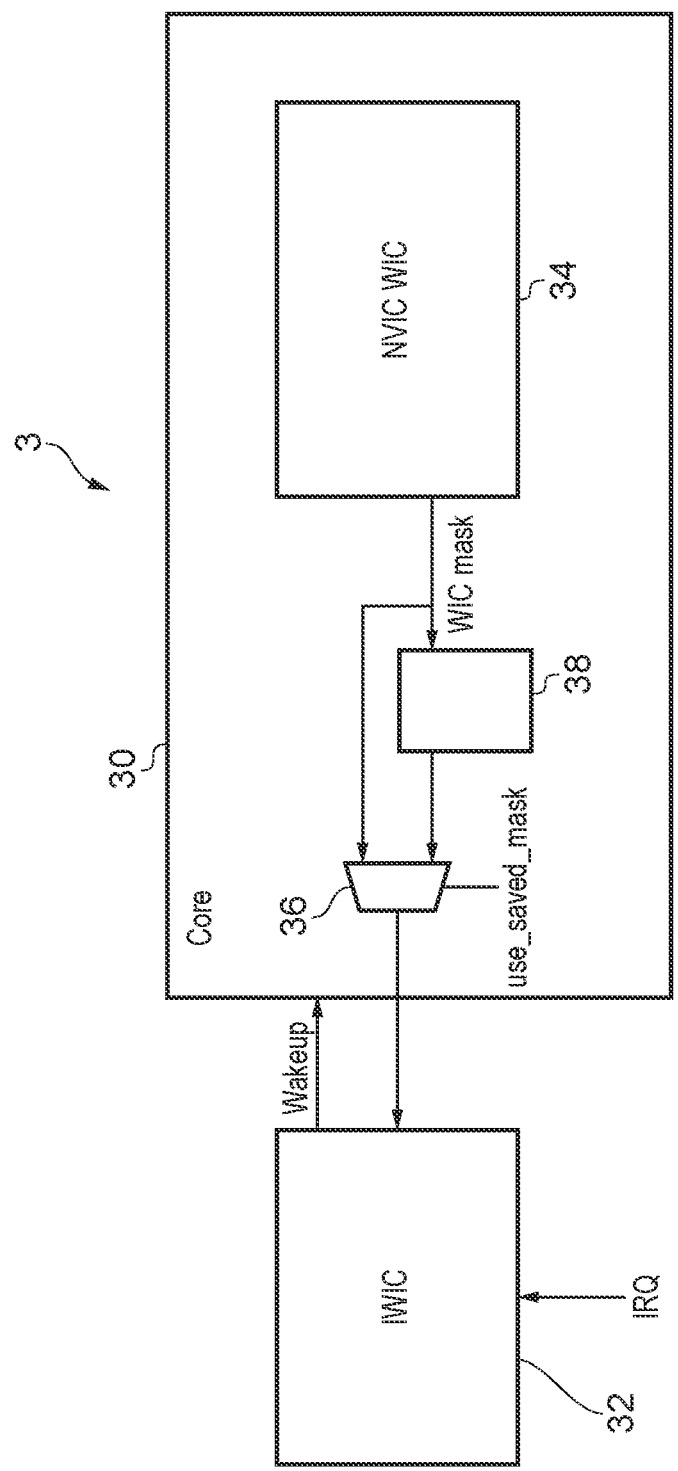
FIG. 4 illustrates an apparatus to which the present techniques may be applied.

FIG. 4 illustrates another example apparatus 3 in which the fault detection process described herein may be applied. As shown in FIG. 4, there is provided an apparatus 3 having a core 30. An internal wakeup interrupt controller (IWIC) 32 determines, in response to an interrupt received while the core is in a sleep state, whether to wake the core 30. This decision is made on the basis of a wakeup interrupt controller (WIC) mask calculated by a nested vector interrupt controller (NVIC) wakeup interrupt controller (WIC) 34. The WIC mask is calculated by the NVIC WIC 34 and indicates for the different possible interrupts that may be received by the IWIC 32, whether the interrupts should lead to the core 30 being woken.

In this example, the NVIC WIC comprises processing circuitry to calculate the WIC mask. This processing circuitry comprises a plurality of replicated computation blocks to calculate the different bits of the mask, each bit corresponding to a type of interrupt. Therefore, in accordance with the techniques described herein, the presence of these replicated computation blocks may be taken advantage of to allow the functional safety of the NVIC WIC to be verified. This may be particularly important in this scenario since a fault in the NVIC WIC could lead to an incorrect WIC mask being calculated leading to the core not being woken in response to an interrupt that should be allowed to wake the core, or vice versa.

To latch the WIC mask while the NVIC WIC 34 is performing the fault detection process, storage circuitry 38 is provided on the output path of the NVIC WIC 34 to store the WIC mask. As shown in FIG. 4, a multiplexer 36 can be used to select whether the IWIC 32 receives the WIC mask being output by the NVIC WIC 34 directly or the latched copy of the WIC mask stored in storage circuitry 38.

Figure 5:
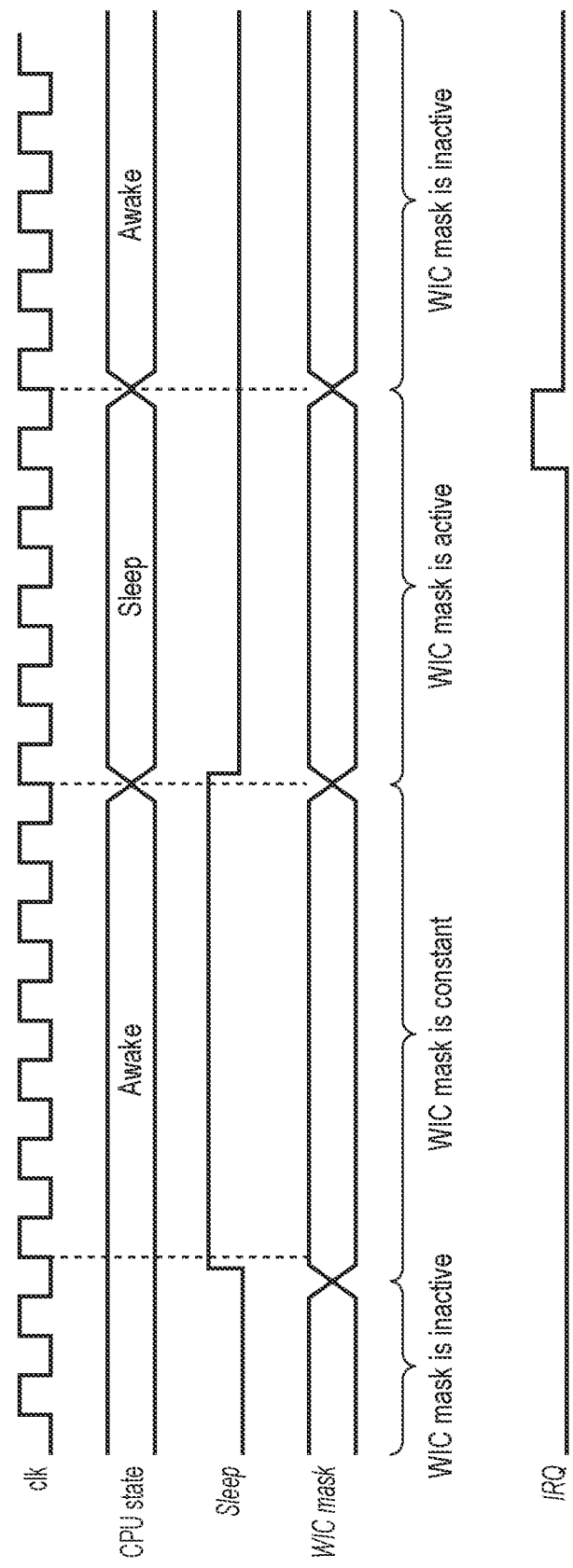
FIG. 5 is a timing diagram illustrating a period in which the fault detection mode in the apparatus of FIG. 4 may be used.

FIG. 5 is a timing diagram illustrating a period in which the fault detection mode in the apparatus 3 of FIG. 4 may be used. The top line of FIG. 5 shows a clock signal as described in relation to FIG. 1B. The second line of FIG. 5 indicates whether the core is awake or asleep. As can be seen in FIG. 5, the core is initially awake, and then a sleep signal depicted in the third line is asserted. After a period of this sleep signal being asserted, the core enters the sleep state. Later, as illustrated on the bottom line of FIG. 5, an interrupt is received which the IWIC 32 determines to be an interrupt that is able to wake the core 30. As such, the core is woken and so the core is again in the awake state.

The fourth line of FIG. 5 illustrates the stability or otherwise of the WIC mask signal from the NVIC WIC 34 to the IWIC 32. As can be seen in FIG. 5, while the core 30 is awake, the WIC mask is inactive and the WIC mask signal is active while the core 30 is asleep. However, during the period in which the sleep signal is asserted, the WIC mask signal has a constant value. Since it is known that the WIC mask signal will have a constant value while the sleep signal is asserted, fault detection control circuitry may determine that fault detection can be carried during this period and cause the NVIC WIC 34 to enter a fault detection mode. The operation of the NVIC WIC 34 in the fault detection mode will be discussed with reference to FIGS. 6A-6C.

Figure 6A:
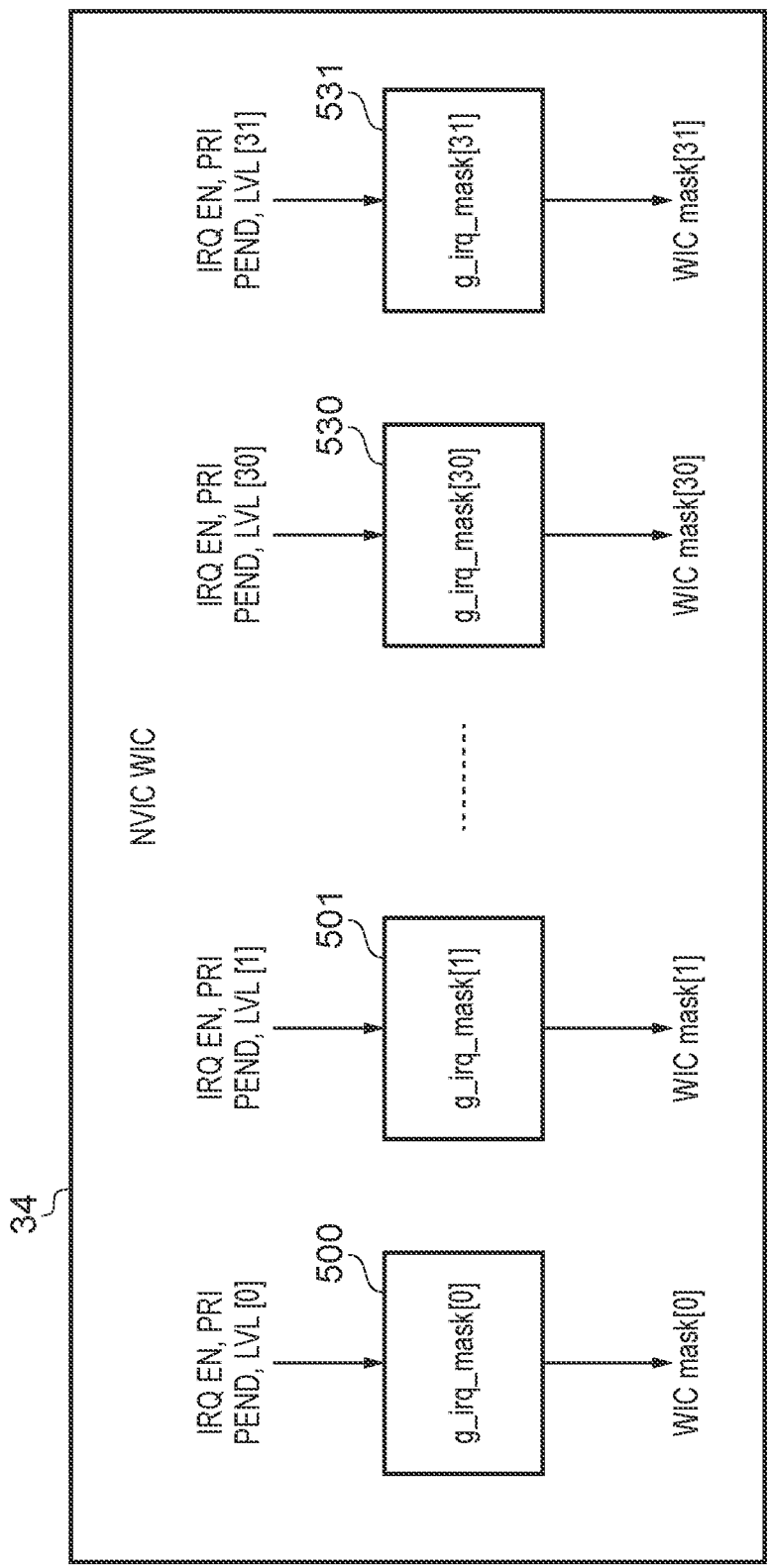
FIGS. 6A-6C illustrate a fault detection process being performed in the apparatus of FIG. 4.

FIG. 6A illustrates the NVIC WIC 34. The NVIC WIC 34 comprises a series of computation blocks 500-531. Each of these computation blocks corresponds to a bit of the WIC mask such that each computation block carries out a calculation to determine the value of a bit of the WIC mask. These bits can then be concatenated together to produce the WIC mask. Therefore, when it is determined that the WIC mask signal is stable, the WIC mask may be latched in the storage circuitry 38 and the multiplexer 36 used to provide the signal from the storage circuitry 38 to the IWIC 32.

Figure 6B:
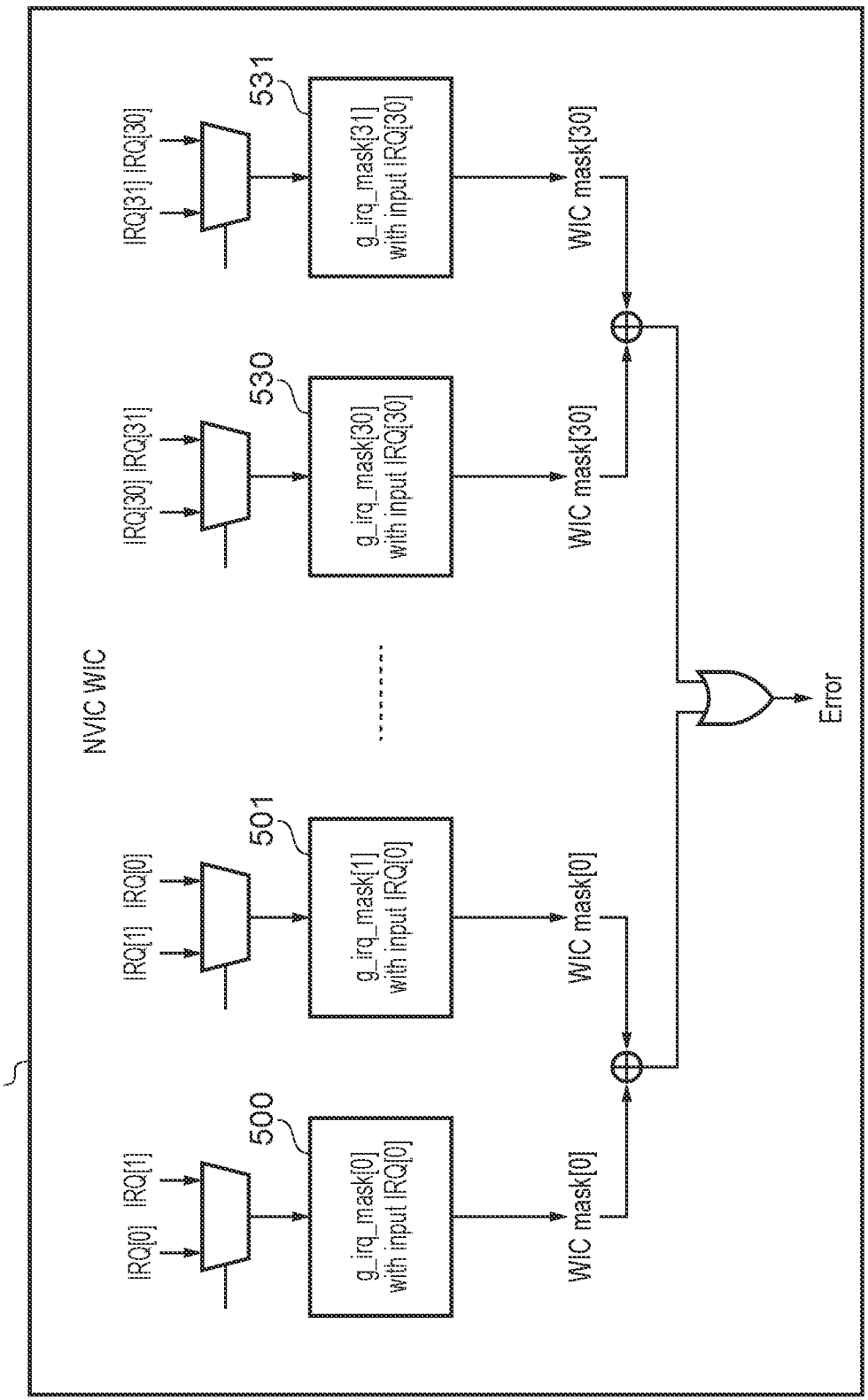

Then, as illustrated in FIG. 6B, in a pairwise manner, the inputs from a first computation block 500, 530 of each pair are provided to the second computation block 501, 531 of each pair. Looking at the first pair of computation blocks 500, 501, both of these blocks are calculating the 0th bit of the WIC mask. Thus, by comparing the outputs of these calculations, it can be determined whether there is an error in one or both of the computation blocks 500, 501. Similarly, for the other pairs of computation blocks, the outputs can be compared to determine whether there is a mismatch. As shown in FIG. 6B, indications of whether a mismatch has been detected for each pair are ORed together to produce an overall indication of whether a fault has been detected in the NVIC WIC 34. If such an error is detected, certain functionality of the apparatus 3 may be suspended, the user alerted, and/or an exception raised.

Figure 6C:
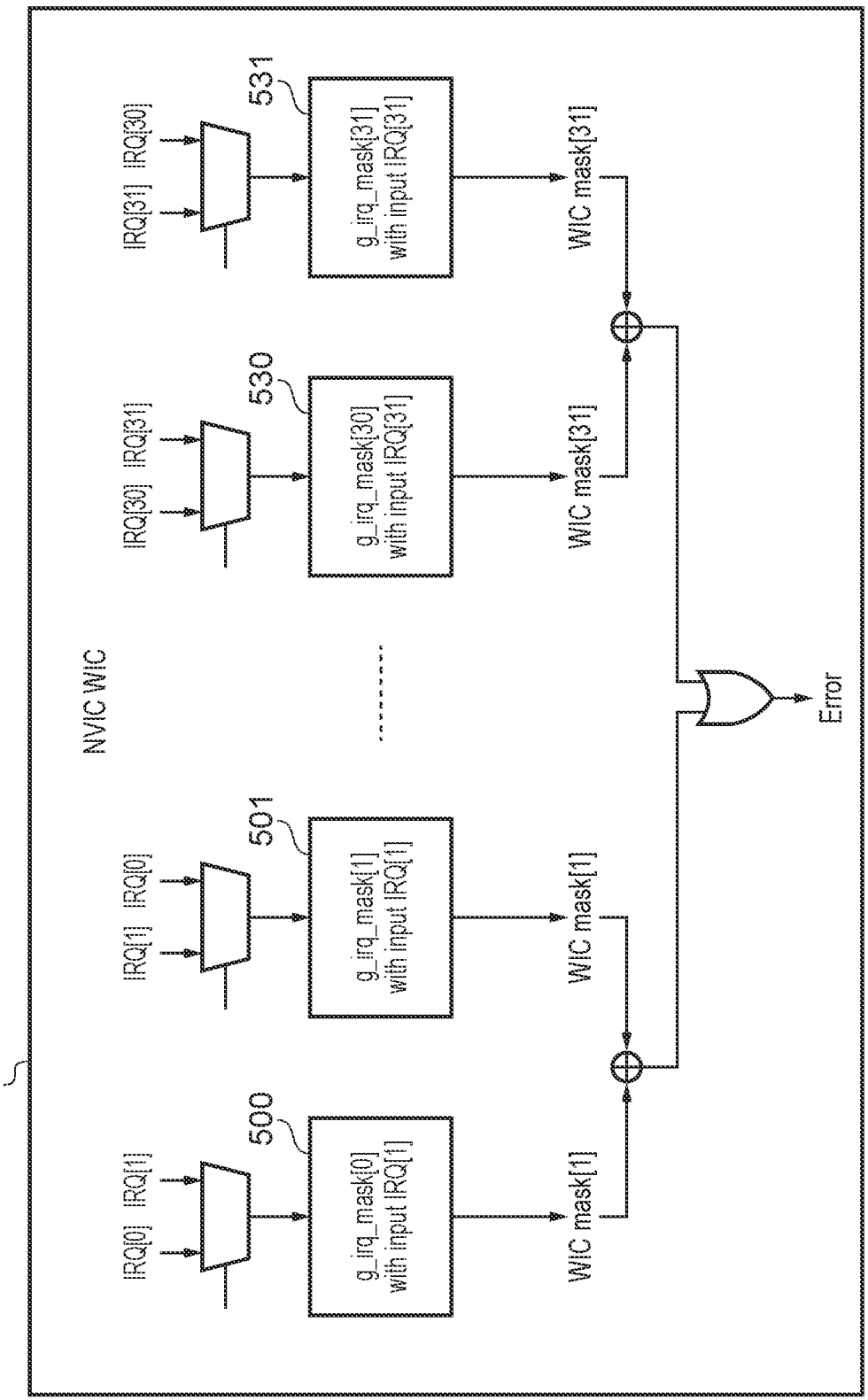

FIG. 6C illustrates the input value to the other computation block 501, 531 of each pair of computation blocks being provided as the input to both computation blocks of each pair. So, for the first pair of computation blocks 500, 501, the input to computation block 501 is provided to both computation blocks 500, 501 of the pair. Therefore, by comparing the outputs of these blocks, a fault in one of the computation blocks that affects the behaviour of the block when operating in response to the input value of the second computation block can be detected. Again, indications of whether a fault was detected for each pair can be combined using a logical OR operation to provide an indication of whether a fault was detected for any of the computation blocks of the NVIC WIC 34.

Thus, there has been described a fault detection process by which already replicated elements of processing circuitry in an apparatus can be used to perform fault detection in an area and power efficient manner without interfering with the operation of the processing circuitry itself.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
   processing circuitry comprising at least two replicated computation blocks, each computation block configured to perform a particular calculation based on a respective input value to produce a respective output value to be used as a result of the calculation; and
   storage circuitry arranged on output paths of the computation blocks and arranged to store the output values of the computation blocks;
   wherein the processing circuitry is operable in a fault detection mode to:
     latch the output values of the computation blocks in the storage circuitry and present, as the result of calculations, the stored values;
     provide a first input value for a first computation block as an input value to one or more additional computation blocks of the at least two replicated computation blocks; and
     compare the output values of the one or more additional computation blocks, when performing the calculation based on the first input value, with an output value of the first computation block when performing the calculation based on the first input value;
   wherein the processing circuitry is responsive to detecting a mismatch in the comparison to determine that a fault exists in at least one of the computation blocks.

2. The apparatus according to claim 1, wherein:
   the processing circuitry, when operating in the fault detection mode, is further to:
     provide a second input value of a second computation block different to the first computation block to at least the first computation block; and
     compare the output values of the second computation block with at least the first computation block.

3. The apparatus according to claim 1, wherein:
   the apparatus comprises fault detection control circuitry configured to detect an upcoming period for which input values to the processing circuitry are expected to be stable and, in response to said detection, cause the processing circuitry to enter the fault detection mode.

4. The apparatus according to claim 3 wherein:
   timing for the processing circuitry is provided by a clock signal; and
   the fault detection control circuitry is configured to cause the processing circuitry to enter the fault detection mode in response to detecting that the input values will be stable for a number of clock cycles exceeding a threshold.

5. The apparatus according to claim 4, wherein:
   the threshold is two clock cycles or three clock cycles.

6. The apparatus according to claim 3, wherein:
   the fault detection control circuitry is configured to cause the processing circuitry to exit the fault detection mode in advance of an expected change in the input values to the processing circuitry.

7. The apparatus according to claim 1, wherein:
   the at least two replicated computation blocks comprise two or more pairs of replicated computation blocks; and
   when operating in the fault detection mode, the processing circuitry is configured to provide a first input value for a first computation block of each pair of computation blocks to a second computation block of each pair of computation blocks; and
   for each pair of computation blocks, compare the output value of the first computation block with the output value of the second computation block; and
   wherein in response to detecting a mismatch in the comparison for any of the pairs, the processing circuitry is configured to determine that a fault exists in the pair of computation blocks.

8. The apparatus according to claim 7, wherein:
   in response to determining that a particular fault exists in a particular pair of computation blocks, the processing circuitry is configured to store an indication that the particular fault was detected for the particular pair of computation blocks.

9. The apparatus according to claim 8, wherein:
   the processing circuitry is configured to perform a logical OR operation to combine indications of whether a fault was detected for each pair of the two or more pairs replicated computation blocks.

10. The apparatus according to claim 7, wherein:
    the at least two replicated computation blocks further comprise a set of three replicated computation blocks;
    when operating in the fault detection mode, the processing circuitry is configured to provide a first input value for a first computation block of the set of three computation blocks to a second and third computation block of the set of three computation blocks; and
    compare the respective output values of the first, second, and third computation blocks; and
    wherein in response to detecting a mismatch in the comparison for the set of three computation blocks, the processing circuitry is configured to determine that a fault exists in the set of three computation blocks.

11. The apparatus according to claim 1, wherein:
    in response to determining that a fault exists in the at least one of the computation blocks, the processing circuitry is configured to perform at least one of:
      storing an indication of the fault in a register;
      raising an exception;
      disabling functionality associated with the at least one of the computation blocks; and
      notifying a user that functionality associated with the at least one of the computation blocks is disabled.

12. The apparatus according to claim 1, wherein the processing circuitry is configured to combine results of the calculations performed by the at least two computation blocks to produce an overall result for the calculations.

13. The apparatus according to claim 12, wherein combining the results of the calculations comprises concatenating the results of the calculations performed by the at least two computation blocks to produce the overall result.

14. The apparatus according to claim 1, wherein:
    the apparatus comprises an interrupt controller and a wakeup controller associated with a particular core and arranged to receive interrupts for the core; and
    wherein the calculations comprise calculating a portion of an interrupt mask by the interrupt controller, the interrupt mask used by the wakeup controller to determine which received interrupts should be allowed to awakened the core from a sleep state.

15. The apparatus according to claim 14, wherein:
    the wakeup controller is responsive to receiving a particular interrupt when the core is in the sleep state to compare the particular interrupt with the interrupt mask to determine whether the core should be awakened from the sleep state; and in response to determining that the core should be awakened from the sleep state, the wakeup controller is configured to cause the core to be awakened from the sleep state.

16. The apparatus according to claim 15, wherein:

the wakeup controller is an internal wakeup interrupt controller (IWIC); and the interrupt controller is a nested vector interrupt controller wakeup interrupt controller (NVIC WIC).

17. A method of performing fault detection, the method comprising:

performing, by at least two replicated computation blocks, a particular calculation based on respective input values to produce respective output values to be used as results of the calculation;

when operating in a fault detection mode:

latching the output values of the computation blocks in storage circuitry arranged on output paths of the computation blocks and arranged to store the output values of the computation blocks;

presenting, as a result of calculations, the stored values;

providing a first input value for a first computation block as an input value to one or more additional computation blocks of the at least two replicated computation blocks; and comparing the output values of the one or more additional computation blocks, when performing the calculation based on the first input value, with an output value of the first computation block when performing the calculation based on the first input value;

in response to detecting a mismatch in the comparison, determining that a fault exists in at least one of the computation blocks.

18. A non-transitory computer-readable medium to store computer-readable code for fabrication of an apparatus comprising:

processing circuitry comprising at least two replicated computation blocks, each computation block configured to perform a particular calculation based on a respective input value to produce a respective output value to be used as a result of the calculation; and storage circuitry arranged on output paths of the computation blocks and arranged to store the output values of the computation blocks;

wherein the processing circuitry is operable in a fault detection mode to:

latch the output values of the computation blocks in the storage circuitry and present, as the result of the calculations, the stored values;

provide a first input value for a first computation block as an input value to one or more additional computation blocks of the at least two replicated computation blocks; and compare the output values of the one or more additional computation blocks, when performing the calculation based on the first input value, with an output value of the first computation block when performing the calculation based on the first input value;

wherein the processing circuitry is responsive to detecting a mismatch in the comparison to determine that a fault exists in at least one of the computation blocks.

* * * * *